US010523136B2

(12) United States Patent
Kurita et al.

(10) Patent No.: US 10,523,136 B2
(45) Date of Patent: Dec. 31, 2019

(54) INVERTER DEVICE AND METHOD OF CONTROLLING THE SAME

(71) Applicant: Mitsubishi Electric Corporation, Tokyo (JP)

(72) Inventors: Tomohiro Kurita, Tokyo (JP); Naruki Suetake, Tokyo (JP); Tatsuki Kowa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/461,741

(22) Filed: Mar. 17, 2017

(65) Prior Publication Data

US 2018/0091069 A1   Mar. 29, 2018

(30) Foreign Application Priority Data

Sep. 26, 2016  (JP) ................. 2016-186688

(51) Int. Cl.
*H02P 1/16* (2006.01)
*H02P 6/20* (2016.01)
*H02P 27/06* (2006.01)

(52) U.S. Cl.
CPC ................. *H02P 1/16* (2013.01); *H02P 6/20* (2013.01); *H02P 27/06* (2013.01)

(58) Field of Classification Search
CPC .. H02P 8/36; H02P 27/04; H02P 27/06; H02P 8/30; H02P 1/00; H02P 3/00; H02P 3/08; H02P 29/68
See application file for complete search history.

(56) References Cited

U.S. PATENT DOCUMENTS

| 5,717,310 A * | 2/1998 | Sakai ................. B60L 11/1862 307/10.1 |
| 9,735,767 B2 * | 8/2017 | Watanabe .......... H03K 17/0822 |
| 10,199,982 B2 * | 2/2019 | Endoh ................. B62D 5/0496 |

(Continued)

FOREIGN PATENT DOCUMENTS

JP    5-308716 A    11/1993
JP    2003-169474 A    6/2003

(Continued)

OTHER PUBLICATIONS

Communication dated Aug. 15, 2017 from the Japanese Patent Office in counterpart application No. 2016-186688.

*Primary Examiner* — Bickey Dhakal
(74) *Attorney, Agent, or Firm* — Sughrue Mion, PLLC; Richard C. Turner

(57) ABSTRACT

Provided are an inverter device, which is capable of preventing a malfunction of the inverter device while reducing the number of interface wirings, and a method of controlling the inverter device. A communication terminal of a communication circuit having a function of communicating to/from a vehicle, an input terminal for a start signal for starting a control circuit, and a signal for holding the control circuit active even when the start signal is changed after the start of the control circuit are used. A drive prohibition signal issued from the vehicle is received through the same terminal as that for the start signal to unify terminals for the start signal and the drive prohibition signal, to thereby reduce the number of interface wirings.

17 Claims, 5 Drawing Sheets

(56) References Cited

U.S. PATENT DOCUMENTS

| | | | | |
|---|---|---|---|---|
| 2004/0046453 A1* | 3/2004 | Hayashi | ............ | B60R 25/02142 |
| | | | | 307/10.5 |
| 2004/0201938 A1* | 10/2004 | Watanabe | .......... | H03K 17/0822 |
| | | | | 361/103 |
| 2006/0007615 A1* | 1/2006 | Ochiai | .................. | B60L 3/0023 |
| | | | | 361/71 |
| 2007/0103820 A1* | 5/2007 | Kobayashi | ............. | H02H 6/005 |
| | | | | 361/25 |
| 2012/0176117 A1* | 7/2012 | Watanabe | .......... | H03K 17/0822 |
| | | | | 323/312 |
| 2013/0066501 A1* | 3/2013 | Oyama | ................... | B60L 3/003 |
| | | | | 701/22 |
| 2014/0200732 A1* | 7/2014 | Sato | ........................ | B60R 16/02 |
| | | | | 700/300 |
| 2014/0285131 A1* | 9/2014 | Sasaki | ..................... | H02P 29/68 |
| | | | | 318/490 |

FOREIGN PATENT DOCUMENTS

| | | |
|---|---|---|
| JP | 2007-215283 A | 8/2007 |
| JP | 2008-99483 A | 4/2008 |
| JP | 2013-130175 A | 7/2013 |

* cited by examiner

INVERTER DEVICE AND METHOD OF CONTROLLING THE SAME

BACKGROUND OF THE INVENTION

1. Field of the Invention

The present invention relates to an inverter device, which is configured to drive and control an electric motor, and a method of controlling the inverter device.

2. Description of the Related Art

In the following description, an electric motor is a motor, and an inverter device is an inverter configured to drive and control the motor.

When a drive instruction is output from a vehicle to the inverter through communication, the inverter drives the motor. At this time, in order to avoid unintended driving due to a malfunction of a communication circuit or a malfunction of a control circuit, a drive prohibition signal is input from the vehicle to the inverter.

In general, a start signal terminal, through which a start signal for starting the control circuit of the inverter is input, and a drive prohibition signal terminal, through which the drive prohibition signal output from the vehicle is received, are separately provided.

For example, in Japanese Patent Application Laid-open No. 2013-130175, there has been proposed, in an engine starter including an ignition switch (IGSW) terminal, through which an IGSW signal is input, and a drive signal terminal, through which a drive signal is input, determining whether or not the vehicle is in a driving period of an engine based on states of the IGSW signal and the drive signal.

Providing interface wirings for each purpose of the drive signal and the start signal, which are output from the vehicle, as in the related-art inverter described above, increases the number of harnesses between the vehicle and the inverter, and increases the number of connector terminals, to thereby result in increases in size and cost of the inverter.

SUMMARY OF THE INVENTION

The present invention has been made to solve the above-mentioned problems, and therefore has an object to provide an inverter device, which is capable of preventing a malfunction of the inverter device while reducing the number of interface wirings, and a method of controlling the inverter device.

According to one embodiment of the present invention, there are provided an inverter device and the like, including: an inverter circuit configured to drive and control an electric motor; a control circuit including a controller, which is configured to supply a gate signal to the inverter circuit, and a power supply circuit; a start management terminal through which a start signal for starting the power supply circuit and a drive prohibition signal for prohibiting the control circuit from driving and controlling the electric motor are to be input from outside the inverter device; and a start switch, which is connected between the start management terminal and the control circuit, and is configured to be turned on upon receiving the start signal as input, to thereby supply external electric power to the power supply circuit and drive the power supply circuit, and to hold an on state during a period in which a hold signal from the controller is received, the controller including: a power supply holding unit configured to output the hold signal after the power supply circuit is started; and a drive and control determination unit configured to determine whether or not to drive and control the electric motor depending on a state of the start signal after the power supply circuit is started.

According to the present invention, in the inverter device, the malfunction of the inverter device can be prevented while the number of interface wirings is reduced.

DESCRIPTION OF THE EMBODIMENTS

In the present invention, there is provided a function of holding an inverter active even when a start signal is changed after the inverter is started. Further, a drive prohibition signal, which is issued under an instruction from a vehicle, is received through the same terminal as that for the start signal such that the start signal and the drive prohibition signal are received through one terminal.

More specifically, after the inverter is started with the start signal from the vehicle, the start signal from the vehicle is processed as the drive prohibition signal so that the drive prohibition signal from the vehicle may be received without increasing the number of interface wirings.

Now, an inverter device and a method of controlling the inverter device according to each of embodiments of the present invention are described with reference to the drawings. Note that, in each of the embodiments, the same or corresponding portions are denoted by the same reference symbols, and the overlapping description thereof is omitted.

First Embodiment

Figure 1:
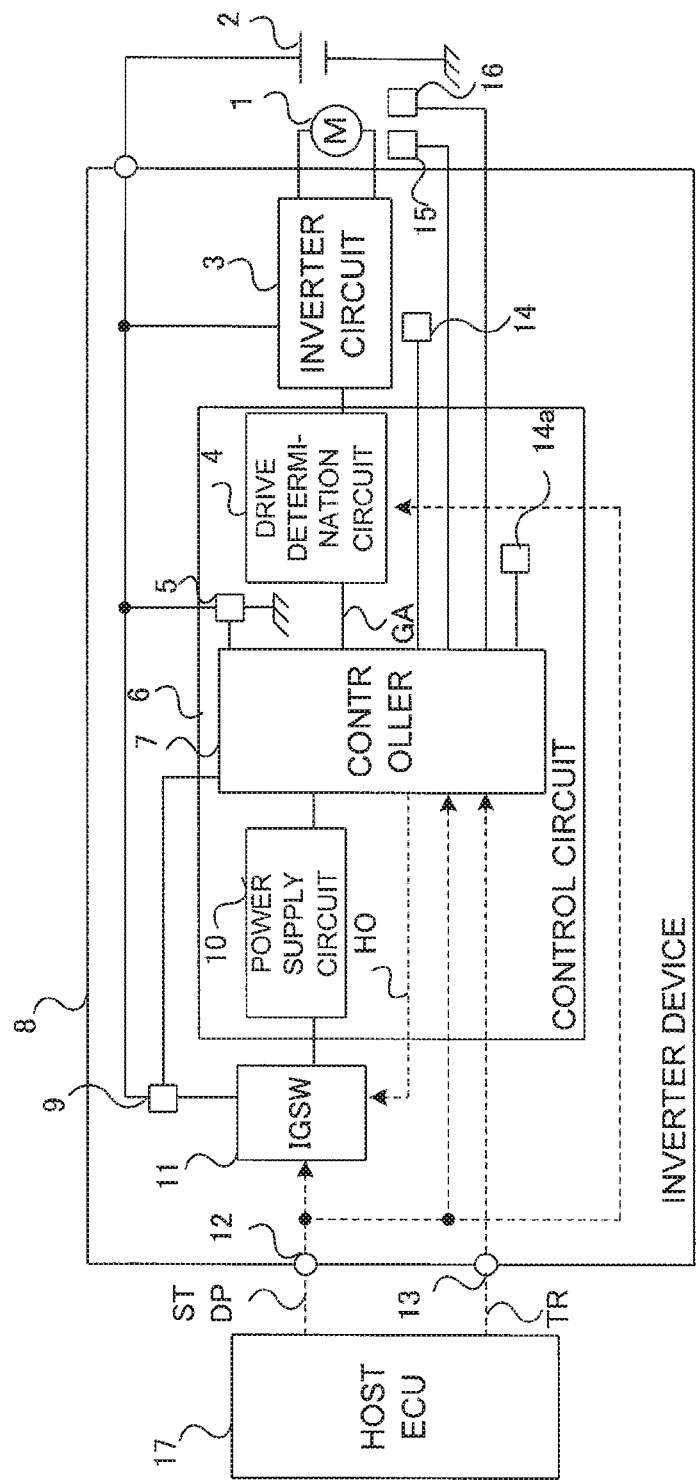
FIG. 1 is a diagram for illustrating an example of a configuration of an inverter device according to the present invention.

FIG. 1 is a diagram for illustrating an example of a configuration of the inverter device according to the present invention. A rotation sensor 16, which is configured to detect rpm, is mounted on an electric motor, that is, a motor 1. The rotation sensor 16 is configured to output the rpm of the motor 1 to a controller 7. A temperature sensor 15 is mounted on the motor 1, and is configured to detect a temperature of the motor 1 and output the temperature to the controller 7. A temperature sensor 14 is mounted on an inverter circuit 3, which is a drive circuit for the motor 1, and is configured to detect a temperature of the inverter circuit 3 and output the temperature to the controller 7. A temperature sensor 14a is mounted on a control circuit 6, which includes a power supply circuit 10, the controller 7, and a drive determination circuit 4, and is configured to detect a temperature of the control circuit 6 and output the temperature to the controller 7.

A voltage sensor 5 is configured to detect a voltage of a direct current (DC) power source 2, which serves as a power source for an inverter 8 serving as the inverter device, and output a voltage value to the controller 7. A current sensor 9 is configured to detect a current flowing through an ignition switch (IGSW) 11, which is a start switch, and output a current value to the controller 7.

A start management terminal 12 is a terminal through which a start signal (ST) for turning the IGSW 11 on is input from outside the device. Moreover, after the controller 7 is started, a drive prohibition signal (DP) is input through the start management terminal 12. A communication terminal 13 is a terminal through which a communication signal (TR) for communicating to/from a vehicle is input/output from/to outside the device. The start signal (ST) and the drive prohibition signal (DP) are input from a host electronic control unit (ECU) 17, which is an external device mounted on the vehicle including the motor 1, for example, and the communication signal (TR) is transmitted and received between the inverter 8 and the host ECU 17.

The DC power source 2 is arranged in order to drive the motor 1, and is configured to supply a DC voltage to the inverter 8. The DC power source 2 may be formed of a battery, for example.

After being turned on with the start signal (ST), the IGSW 11 is held in an on state by a hold signal (HO) output from the controller 7, and is configured to hold the on state regardless of a state of the start signal (ST). The IGSW 11 is configured to supply electric power from the DC power source 2 to the power supply circuit 10 to drive the power supply circuit 10 while in the on state.

The power supply circuit 10 is configured to step-down or step-up the voltage of the DC power source 2 to supply power to the respective elements of the control circuit 6. The inverter circuit 3, which is configured to drive the motor 1, includes a switching element portion (not shown) configured to turn a switching element on or off depending on a gate signal (GA) output from the controller 7.

The drive determination circuit 4 is configured to switch between conduction and interruption of the gate signal (GA), which is output from the controller 7 to the inverter circuit 3, depending on the drive prohibition signal (DP) input through the start management terminal 12. The controller 7 is configured to output the hold signal (HO) for holding the on state of the IGSW 11 to the IGSW 11 when the voltage is supplied from the power supply circuit 10.

The controller 7 is configured to, when rpm information output from the rotation sensor 16 is outside a preset range (RMre1), determine that the inverter 8 needs to be stopped, and turn the IGSW 11 off with the hold signal (HO) to stop the inverter 8.

The controller 7 is also configured to control the IGSW 11 to stop the inverter 8 in a case where an instruction to stop the inverter 8 is issued as the communication signal (TR) from the host ECU 17.

Figure 2:
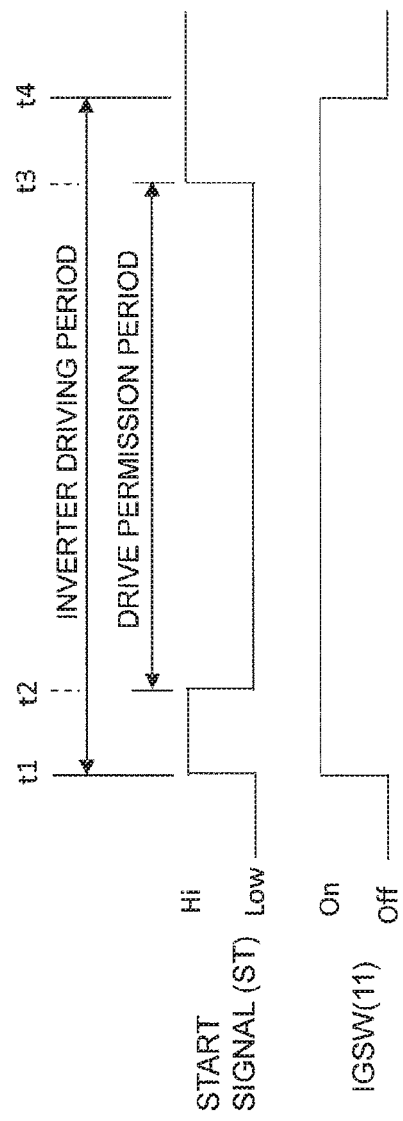
FIG. 2 is a timing chart of a start signal and an IGSW according to a first embodiment of the present invention.

FIG. 2 is a timing chart of the start signal (ST) and the IGSW 11 according to the first embodiment. For example, when the start signal (ST), which is a high active digital signal, becomes an "H" level at time t1, the IGSW 11 enters a conductive state, that is, an on state, and a voltage is applied from the power supply circuit 10 to the controller 7 to start the controller 7. After the controller 7 is started, the IGSW 11 is held in the on state by the hold signal (HO) output from the controller 7. Even when the start signal (ST) becomes an "L" level at time t2, the IGSW 11 is held in the on state, and drive of the motor is determined to be permitted.

The inverter 8 is stopped by the controller 7 determining that the inverter 8 needs to be stopped and making, at time t4, the hold signal (HO) enter a disabled state to make the IGSW 11 enter an off state, for example.

As described above, after the controller 7 is started with the start signal (ST), the IGSW 11 is held in the on state by the hold signal (HO) from the controller 7 so that the drive prohibition signal (DP) may be input through the start management terminal 12, with the result that the start signal (ST) and the drive prohibition signal (DP) may be input through one terminal.

The state in which the inverter 8 is to be stopped is determined by the controller 7 depending on at least one piece of state information, which is output from the temperature sensor 14, the temperature sensor 14a, the temperature sensor 15, the voltage sensor 5, the current sensor 9, and the rotation sensor 16 to the controller 7, and which is selected from temperatures, a voltage, a current, and rpm at portions to which the sensors of the inverter 8 and the motor 1 are provided.

Figure 3:
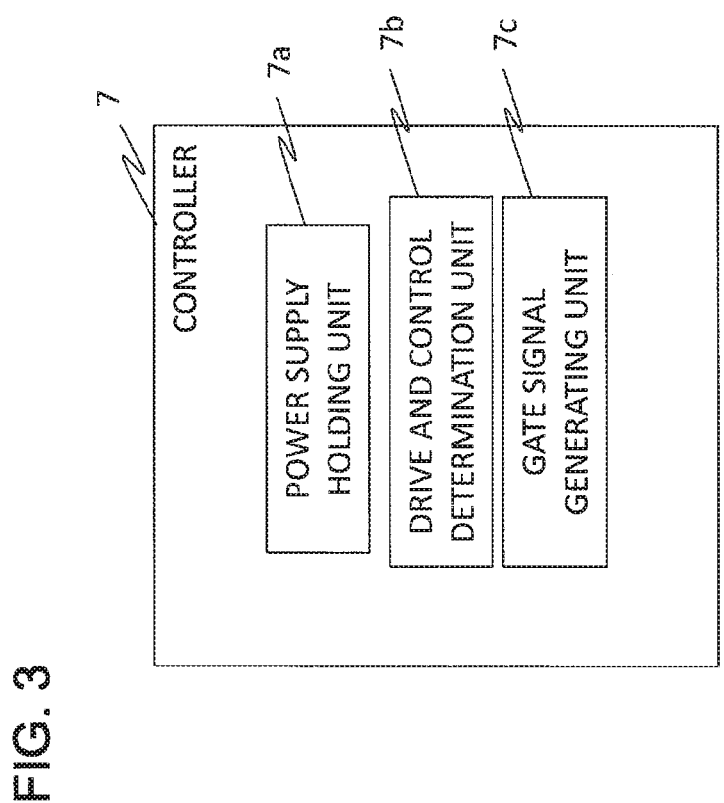
FIG. 3 is a functional block diagram for illustrating a controller of the inverter device according to the present invention.
Figure 4:
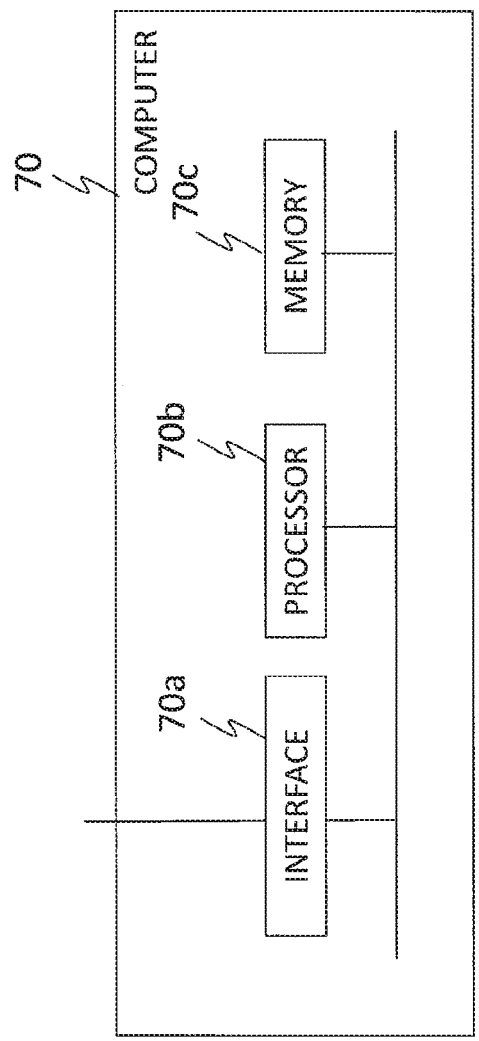
FIG. 4 is a schematic configuration diagram of a case where the controller of the inverter device according to the present invention is formed of a computer.

The controller 7 is formed of a computer, for example, and is illustrated in a functional block diagram of FIG. 3 and a schematic configuration diagram of FIG. 4. As illustrated in FIG. 3, the controller 7 functionally includes a power supply holding unit 7a, a drive and control determination unit 7b, and a gate signal generating unit 7c, for example. The power supply holding unit 7a is configured to output the hold signal (HO) when the IGSW 11 is turned on with the start signal (ST) to supply power to the controller 7. The drive and control determination unit 7b is configured to determine whether or not to drive and control the motor 1 depending on various conditions that are set in advance. The gate signal generating unit 7c is configured to generate and output, to the inverter circuit 3, the gate signal (GA) for driving the motor 1 depending on the communication signal (TR) from the host ECU 17 and the state information from the various sensors described above, for example.

Alternatively, the controller 7 may be formed of a computer 70 having a configuration that is schematically illustrated in FIG. 4, for example. Input and output are performed through an interface 70a. In a memory 70c, programs for performing the various functions illustrated as the functional blocks in FIG. 3, and various setting ranges and other such information, data, and the like required in processing are stored in advance, and further, processing results and the like are stored. A processor 70b is configured to perform arithmetic processing on signals, which are input through the interface 70a, in accordance with the various programs, information, and data stored in the memory 70c, and to output the processing results through the interface 70a or store necessary processing steps and the processing results in the memory 70c.

The controller 7 may be formed of one or a plurality of digital circuits configured to execute the various functions illustrated as the functional blocks in FIG. 3.

The inverter device 8 according to the first embodiment of the present invention includes the inverter circuit 3, which is configured to drive and control the motor 1, the control circuit 6 including the controller 7, which is configured to supply the gate signal (GA) to the inverter circuit 3, the power supply circuit 10, and the drive determination circuit 4, the start management terminal 12, through which the start signal (ST) for starting the power supply circuit 10 and the drive prohibition signal (DP) for prohibiting the control circuit 6 from driving and controlling the motor 1 are input from outside the device, the communication terminal 13, through which the communication signal (TR) is input/output from/to outside the device, and the start switch 11, which is connected between the start management terminal 12 and the control circuit 6, and is configured to be turned on when the start signal (ST) is input, to thereby supply external electric power to the power supply circuit 10 and drive the power supply circuit 10, and to hold the on state during a period in which the hold signal (HO) from the controller 7 is received.

Further, the controller 7 includes the power supply holding unit 7a, which is configured to output the hold signal HO after the power supply circuit 10 is started, and the drive and control determination unit 7b, which is configured to determine whether or not to drive and control the motor 1 depending on the state of the start signal ST after the power supply circuit 10 is started.

Moreover, the start signal (ST) is formed of a digital signal. Further, the drive and control determination unit 7b is configured to determine whether or not to drive and control the motor 1 depending on a logic state of the start signal (ST). The logic state of the start signal (ST) is the "L" level or the "H" level of the digital signal.

The motor 1 and the inverter device 8 are provided with a plurality of detection sensors (14, 14a, 15, and 16), which are configured to detect the states of the portions. The power supply holding unit 7a is configured to stop outputting the hold signal (HO) to stop the inverter device 8 when the rpm of the motor 1, which is detected by the rotation sensor 16, is within a set rpm range (RErel), for example.

The inverter device 8 also includes a plurality of detection sensors (5 and 9) configured to detect a voltage and a current of external electric power. The power supply holding unit 7a is configured to stop outputting the hold signal (HO) to stop the inverter device 8 when a voltage (V5) of the external electric power, which is detected by the voltage sensor 5, is outside a set voltage range (Vre1) after the start with the start signal (ST).

The power supply holding unit 7a is also configured to stop outputting the hold signal (HO) to stop the inverter device 8 when at least one of the motor 1, the inverter circuit 3, and the control circuit 6, which are detected by the temperature sensors (15, 14, and 14a), is outside a set temperature range (Tre1) thereof after the start with the start signal (ST).

The power supply holding unit 7a is also configured to stop outputting the hold signal (HO) to stop the inverter device 8 when a current (I9) of the external electric power, which is detected by the current sensor 9, is outside a set current range (Ire1) after the start with the start signal (ST).

Moreover, the start signal (ST) is formed of a digital signal, and the drive and control determination unit 7b is configured to determine whether or not to drive and control the motor 1 depending on a logic state of the start signal (ST). Further, the power supply holding unit 7a is configured to stop outputting the hold signal (HO) to stop the inverter device 8 when the communication signal (TR), which is input and output through the communication terminal 13, is not input for a set period (T) or more.

Second Embodiment

Figure 5:
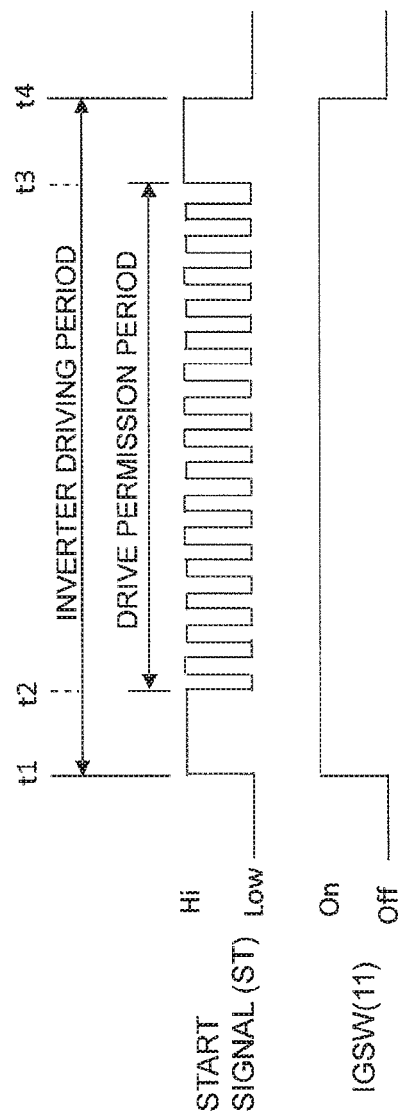
FIG. 5 is a timing chart of a start signal and an IGSW according to a second embodiment of the present invention.

FIG. 5 is a timing chart of the start signal (ST) and the IGSW 11 according to a second embodiment of the present invention. In the second embodiment, in the inverter 8 according to the first embodiment, after the control circuit 6 is started with the start signal (ST), it is determined whether to permit or prohibit driving the motor depending on a duty ratio of the start signal (ST).

An overall configuration of the inverter 8 is the same as that in the above-mentioned embodiment described with reference to FIG. 1, FIG. 3, and FIG. 4.

In FIG. 5, when the start signal (ST) first becomes the "H" level at time t1, the IGSW 11 enters a conductive state, that is, an on state, and the controller 7 is started. After the controller 7 is started, the IGSW 11 is held in the on state with the hold signal (HO) output from the controller 7. When at time t2 the start signal (ST) becomes a duty signal that switches between the "H" level and the "L" level, it is determined to be in a state permitting drive of the motor.

The inverter 8 is stopped when the start signal (ST) has been in a state of the "L" level, for example, which indicates an inactive state, longer than a period based on a set frequency or duty ratio, or when the controller 7 determines that the inverter 8 needs to be stopped.

The state in which the inverter 8 is to be stopped may be determined depending on a relationship between state information, which is output from the rotation sensor 16, the temperature sensors 14, 14a, and 15, the voltage sensor 5, and the current sensor 9 to the controller 7, and the set ranges of the state information.

The controller 7 may be configured to determine that the motor is in a state permitting drive of the motor, that is, to be in a drive permission period only when the frequency of the duty signal of the start signal (ST) is in the set range. When the frequency of the duty signal is outside the set range, the inverter 8 is stopped.

In the inverter device 8 according to the second embodiment of the present invention, the start signal (ST) includes a period of being the duty signal. The drive and control determination unit 7b is configured to determine not to drive and control the motor when the start signal (ST) does not include the period of being the duty signal. The power supply holding unit 7a is configured to stop outputting the hold signal (HO) to stop the inverter device 8 when determining that the start signal (ST) has been in the state of a level indicating the inactive state longer than a set period.

Alternatively, when the start signal (ST) includes a period of being a duty signal in a set frequency range (FRre1), the drive and control determination unit 7b determines not to drive and control the motor when the start signal (ST) does not include the period of being the duty signal in the set frequency range (FRre1). The power supply holding unit 7a is configured to stop outputting the hold signal (HO) to stop the inverter device 8 when the start signal (ST) does not include the period of being the duty signal in the set frequency range (FRre1).

What is claimed is:
1. An inverter device, comprising:
an inverter circuit configured to drive and control an electric motor;
a control circuit comprising a controller, which is configured to supply a gate signal to the inverter circuit, and a power supply circuit;
a start management terminal through which a start signal for starting the power supply circuit and a drive prohibition signal for prohibiting the control circuit from driving and controlling the electric motor are to be input from outside the inverter device; and
a start switch, which is electrically connected between the start management terminal and the control circuit, and is configured to be turned on upon receiving the start signal as input, to thereby supply external electric power to the power supply circuit and drive the power supply circuit, and to hold an on state during a period in which a hold signal from the controller is received and in response to receiving the hold signal, the controller comprising:
a power supply holding unit configured to output the hold signal after the power supply circuit is started; and
a drive and control determination unit configured to determine whether or not to drive and control the electric motor depending on a state of the start signal after the power supply circuit is started.

2. The inverter device according to claim 1,
wherein the start signal comprises a digital signal, and the drive and control determination unit is configured to determine whether or not to drive and control the electric motor depending on a logic state of the start signal,
wherein the inverter device further comprises a plurality of detection sensors configured to detect states of portions of the electric motor and the inverter device, and
wherein the power supply holding unit is configured to stop outputting the hold signal to stop the inverter device when rpm of the electric motor, which is detected by one of the plurality of detection sensors, is within a set rpm range.

3. The inverter device according to claim 2, wherein the control circuit comprises a drive determination circuit, which is configured to determine whether or not to supply the gate signal from the controller to the inverter circuit depending on the state of the start signal and the drive prohibition signal.

4. The inverter device according to claim 1, further comprising a plurality of detection sensors configured to detect the external electric power and operating conditions of the electric motor and the inverter device,
wherein the power supply holding unit is configured to stop outputting the hold signal to stop the inverter device when a voltage of the external electric power, which is detected by one of the plurality of detection sensors, is outside a set voltage range after the start with the start signal.

5. The inverter device according to claim 4, wherein the control circuit comprises a drive determination circuit, which is configured to determine whether or not to supply the gate signal from the controller to the inverter circuit depending on the state of the start signal and the drive prohibition signal.

6. The inverter device according to claim 1, further comprising a plurality of detection sensors configured to detect operating conditions of the electric motor and the inverter device,
wherein the power supply holding unit is configured to stop outputting the hold signal to stop the inverter device when at least one of the electric motor, the inverter circuit, and the control circuit, which are detected by the plurality of detection sensors, is outside a set temperature range thereof after the start with the start signal.

7. The inverter device according to claim 6, wherein the control circuit comprises a drive determination circuit, which is configured to determine whether or not to supply the gate signal from the controller to the inverter circuit depending on the state of the start signal and the drive prohibition signal.

8. The inverter device according to claim 1, further comprising a plurality of detection sensors configured to detect the external electric power and operating conditions of the electric motor and the inverter device,
wherein the power supply holding unit is configured to stop outputting the hold signal to stop the inverter device when a current of the external electric power, which is detected by one of the plurality of detection sensors, is outside a set current range after the start with the start signal.

9. The inverter device according to claim 8, wherein the control circuit comprises a drive determination circuit, which is configured to determine whether or not to supply the gate signal from the controller to the inverter circuit depending on the state of the start signal and the drive prohibition signal.

10. The inverter device according to claim 1, further comprising a communication terminal through which a communication signal is to be input/output from/to outside the inverter device,
wherein the start signal comprises a digital signal, and the drive and control determination unit is configured to determine whether or not to drive and control the electric motor depending on a logic state of the start signal, and
wherein the power supply holding unit is configured to stop outputting the hold signal to stop the inverter device when the communication signal input/output through the communication terminal is not inputted for a set period or more.

11. The inverter device according to claim 10, wherein the control circuit comprises a drive determination circuit, which is configured to determine whether or not to supply the gate signal from the controller to the inverter circuit depending on the state of the start signal and the drive prohibition signal.

12. The inverter device according to claim 1,
wherein the start signal includes a period of being a duty signal,
wherein the drive and control determination unit is configured to determine not to drive and control the electric motor when the start signal does not include the period of being the duty signal, and
wherein the power supply holding unit is configured to stop outputting the hold signal to stop the inverter device when determining that the start signal has been in a state of a level indicating an inactive state longer than a set period.

13. The inverter device according to claim 12, wherein the control circuit comprises a drive determination circuit, which is configured to determine whether or not to supply the gate signal from the controller to the inverter circuit depending on the state of the start signal and the drive prohibition signal.

14. The inverter device according to claim 1,
wherein the start signal includes a period of being a duty signal in a set frequency range,
wherein the drive and control determination unit is configured to determine not to drive and control the electric motor when the start signal does not include the period of being the duty signal in the set frequency range, and
wherein the power supply holding unit is configured to stop outputting the hold signal to stop the inverter device when the start signal does not include the period of being the duty signal in the set frequency range.

15. The inverter device according to claim 14, wherein the control circuit comprises a drive determination circuit, which is configured to determine whether or not to supply the gate signal from the controller to the inverter circuit depending on the state of the start signal and the drive prohibition signal.

16. The inverter device according to claim 1, wherein the control circuit comprises a drive determination circuit, which is configured to determine whether or not to supply the gate signal from the controller to the inverter circuit depending on the state of the start signal and the drive prohibition signal.

17. A method of controlling an inverter device, the inverter device comprising:
- an inverter circuit configured to drive and control an electric motor;
- a control circuit comprising a controller, which is configured to supply a gate signal to the inverter circuit, and a power supply circuit;
- a start management terminal through which a start signal for starting the power supply circuit and a drive prohibition signal for prohibiting the control circuit from driving and controlling the electric motor are to be input from outside the inverter device; and
- a start switch, which is electrically connected between the start management terminal and the control circuit, and is configured to be turned on upon receiving the start signal as input, and to supply external electric power to the power supply circuit and drive the power supply circuit, the method comprising:
outputting, after the power supply circuit is started with the start signal, a hold signal to the start switch to cause the start switch to hold an on state during a period in which the hold signal is received and in response to receiving the hold signal; and
determining whether or not to drive and control the electric motor depending on a state of the start signal after the power supply circuit is started.

* * * * *